Jan. 25, 1966  D. C. VAN DER VIJVER  3,230,990

ONION END CUTTER

Filed Dec. 13, 1963  2 Sheets-Sheet 1

United States Patent Office 3,230,990
Patented Jan. 25, 1966

3,230,990
ONION END CUTTER
Dirk Cornelis van der Vijver, Leyden, Netherlands, assignor to Spyer Brothers & van der Vijver N.V., Rijnsburg, Netherlands, a Dutch corporation
Filed Dec. 13, 1963, Ser. No. 330,411
Claims priority, application Netherlands, Dec. 14, 1962, 286,752
5 Claims. (Cl. 146—83)

This invention relates to an onion end cutter. More particularly the invention relates to a machine for removing protruding parts from more or less spherical agricultural products, in particular from onions, such as small silver skin onions, said machine being provided with a rotating plate having openings therein, on which plate the products are adapted to lie in operation and to be moved therewith in a path, bordered by the turns of a spiral separating wall positioned above the plate and supported by a supporting structure, a set of rotating knives being provided immediately below the plate to cut off parts of the agricultural products extending downwards through the openings of the plate, there being also provided above the plate and free from contact therewith a set of flexible holding members connected to and suspended from the said supporting structure for keeping the products down on the plate and for retarding them in relation to the movement of the plate.

Machines of the above-described type are well known. Known machines of this kind are for instance provided with holding members embodied as mutually independent hanging lengths of separate metal chains or hanging elastic fingers, rings or loops, suspended resiliently or being themselves resilient, and such fingers, rings or loops may be made from metal or from some plastic material or rubber.

Operation of such a machine is based upon the fact that the products will be moved along the said perforated plate, which is of small thickness, so that at some time during their movement through the machine, they take up a position in which the protrusions to be removed from said products will extend through an opening in said plate and will be cut off by the knives. For such operation it is necessary that the products be held down on the plate and retarded from moving always at the same speed as the plate so as to give them a rolling movement on the plate, which result is obtained by the said holding members.

An object of the invention is to provide an improved machine for cutting off protruding ends from onions and other agricultural products.

According to the present invention the previously mentioned holding members are provided near their lower ends with one or more horizontal protrusions directed substantially tangentially relative to the spiral separating wall and in the path of the approaching onions being advanced by the rotation of the plate.

The holding members are embodied as vertically disposed, substantially radially extending, suspended, uninterrupted sheets of a flexible material, such as rubber. Such sheets are in several respects an improvement over many of the previously known holding structures, such as suspended chains, or the like.

However, plain sheets cause the onions or other products to revolve essentially only about a horizontal axis transverse to the direction of movement of the products through the machine. By providing the sheets with the above-mentioned horizontal protrusions in accordance with the present invention, the products are better caused to move and to revolve in all possible directions. Notwithstanding the fact that the known machines, at least many of them, already have a high efficiency, it has surprisingly appeared that this efficiency may be improved considerably by employing the present invention, in that the removing of the onion ends by the machine will be completed in a shorter time interval and will take place more completely with substantially no damage to the onions or other products.

It is possible and even preferable to make the protrusions themselves from a flexible material, such as rubber.

Moreover it is preferable to apply the invention to the well known type of onion end cutter machines having an eccentric drive which gives the holding members a shaking or vibratory movement including a radial component of movement of the holding means along a short distance. This eccentric drive provides a better stirring, moving and rolling of the products in all possible directions, thus further improving the efficiency of the machine.

The invention will now be explained further with reference to the appended drawings illustrating one embodiment of a machine according to the invention, intended for removing the protruding ends of small silver skin onions.

Figure 1:
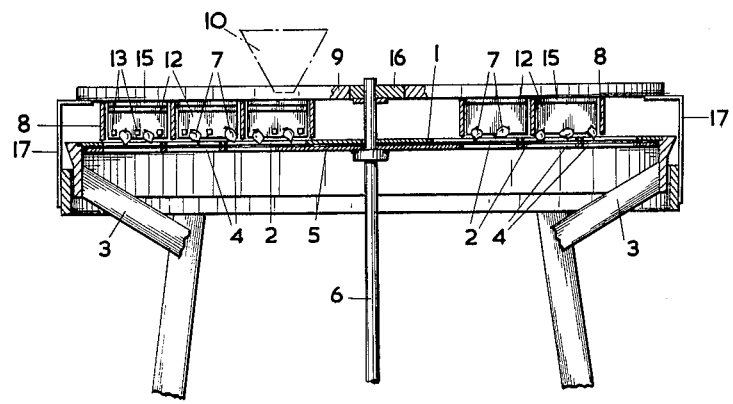
FIG. 1 shows a vertical section of an onion end cutter embodying the invention.
Figure 3:
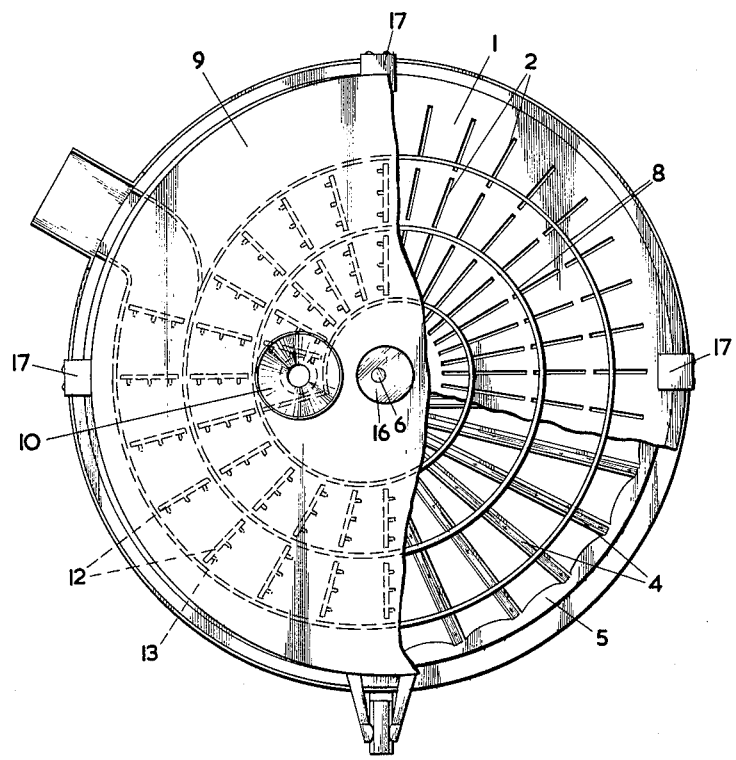
FIG. 3 is a plan elevation view of the cutter of FIG. 1, with portions broken away to show the internal structure.

The machine of FIGS. 1 and 3 has a thin circular steel plate 1, being provided with a large number of slots 2 directed radially. Along its periphery the plate is rigidly connected to and supported by a frame structure 3, which during the operation of the machine is rotated relatively slowly by a simple drive mechanism of a well known type (not shown) mounted below the plate.

Adjacent to the lower surface of the plate 1 a plurality of knives 4 are provided, supported by and connected to a knife carrier disk 5. This disk is mounted on shaft 6, which in operation is driven at high speed by a suitable external drive means through a pulley at the upper end thereof. Shaft 6 is below the plate 4 provided with a suitable bevel gear wheel in engagement with other such wheels of such a gear ratio and arranged so that the frame 3 is rotated by shaft 6, but with a much lower speed than the speed of the knife carrier disc 5.

Several of the silver skin onions are shown in FIG. 1 and they are indicated by 7. They should move in a continuous flow over the plate 1. In order to make the path of the onions over the plate 1 as long as possible, this path has the shape of a spiral. The turns of this spiral are separated mutually by a spiral separating wall 8. This wall 8 is suspended over the plate 1 from a supporting structure 9 so as to leave a small clearance between the lower edge of the wall 8 and the plate 1.

The onions are fed near the center of the plate from a hopper 10, and at the outer periphery of the plate 1 there are means to collect the onions after they leave the spiral path by falling from the outer periphery of the plate 1.

In order to keep the onions on the plate 1 and to retard their movement so that they will roll on and with respect to the plate, a considerable number of retarding holding members, here embodied as rubber sheets 12, are provided one behind the other in the spiral path of the onions. Said sheets 12 are with their upper edges mounted in the supporting structure 9 and can move elastically in the direction of said path only at their lower ends. By means of the eccentric 16 secured to the rotating shaft 6 rotating the knives 4 it is possible to give a movement of small amplitude in the radial direction to the supporting structure 9, being more or less a shaking movement, serving among others for improving the uniform and regular movement of the onions through the machine. The supporting structure 9 is prevented by means not shown from rotating, and in its shaking movement rests on fixed supports 17. The shaking movement caused by the eccentric 16 results in a more or less circular movement of all points of the supporting structure 9 with a fixed radius, being on the average the radius of eccentricity of the eccentric 16. The means for preventing rotation of the supporting structure 9 with the holding members 12 suspended therefrom may be embodied in a radial arm extending from the structure 9 through a fixed guide in which it is able to pivot and to slide lengthwise.

The sheets 12 are positioned substantially radially with respect to the plate 1, one after the other, in a row which extends along the spiral path of the onions over the plate.

Figure 2:
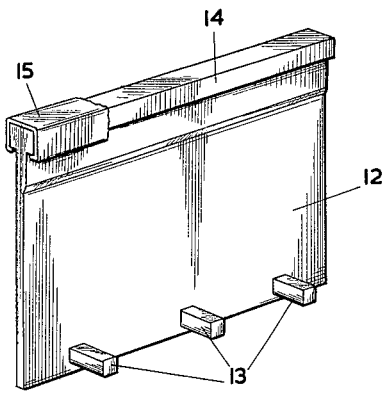
FIG. 2 is a perspective view of a holding member embodied in the cutter of FIG. 1.

As shown in FIG. 2, the sheets 12 at their lower ends each have three horizontally extending rubber protrusions 13 of square cross section. The lower edges of the protrusions 13 are mounted at a height above the upper surface of the plate 1, which is about equal to or somewhat greater than the mean radius of the onions to be treated. The distances between each of the said protrusions are somewhat greater than the mean diameter of the onions. By this arragnement an onion is prevented from being taken up by two adjacent protrusions and raised from the plate. Such raising should be prevented as contact with the plate is necessary to have the onion enter with its projecting ends sufficiently deep into the openings or slots in the plate 1 to allow these ends to be cut off adequately. The protruding length of the protrusions 13 with respect to the sheeet 12 is about equal to the mean radius of the onions.

The protrusions 13 give the onions entering into contact therewith an additional stirring effect by which the onions are more often displaced sideways and are turned or revolved in all possible directions. Thereby the onions are on the average more rapidly treated by cutting off their protruding parts as said protruding parts get more chances to enter into contact with the knives 4.

The sheets 12 have an enlarged upper edge 14 by which they can easily be mounted in the machine, for instance in throughlike profiles 15, mounted rigidly to the lower side of the supporting structure 9. One of said profiles is in part shown in FIG. 2. Thereby the sheets can easily be removed from said profiles by sliding lengthwise therein.

In practice it has appeared that when applying the protrusions 13 it is possible to obtain a higher efficiency and/or to obtain with the same machine and the same quality of the treatment a higher capacity for both. The onions, after traversing the machine during a shorter time and along a shorter path, will already have been treated sufficiently by the knives.

What I claim is:

1. A cutting machine for removing protruding ends from onions and other products, comprising a horizontally disposed rotatable plate adapted to receive a supply of onions and to convey the onions in a spiral path, a spiral separating wall suspended above the plate to define said spiral path, a radially extending supporting structure from which the wall is suspended, said plate having a plurality of openings adapted to allow the protruding ends of the onions to project downwardly therethrough below the plate, a plurality of rotatable knives mounted closely below the plate and adapted to cut off said protruding ends, drive means for rotating the knives and the plate, a plurality of vertically disposed flexible holding members suspended from the supporting structure at intervals along the spiral path and serving to hold the onions down on the plate and retard their movement relative to that of the plate, and a plurality of horizontally disposed protrusions secured to said flexible holding members near the lower ends thereof and in the path of the onions, said protrusions serving to impart stirring and sidewise movements to the onions to facilitate entrance of the onion ends into the openings in the plate for cutting therein.

2. The cutter defined by claim 1, wherein said flexible holding members are uninterrupted sheets of a flexible material, such as rubber, extending transversely across the spiral path and continuously for substantially the entire radial distance between each of the turns of the spiral separating wall.

3. The cutter defined by claim 1, wherein both the flexible holding members and the horizontally disposed protrusions secured thereto are made of a flexible material, such as rubber.

4. The cutter defined by claim 3, wherein the distance between each of the protrusions secured to each holding member is slightly greater than the mean diameter of the onions intended to be cut, so that such onions cannot become jammed therebetween and thereby be elevated above the plate to a position where cutting is not achieved.

5. The cutter defined by claim 4, wherein the length of the protrusions is approximately equal to the mean diameter of the onions intended to be cut, and the protrusions are positioned at a distance above the plate about equal to and may be slightly greater than the means diameter of said onions.

References Cited by the Examiner
UNITED STATES PATENTS
3,057,385  10/1962  Kuilman _____ 146—83 X ROBERT C. RIORDON, *Primary Examiner.*

J. SPENCER OVERHOLSER, *Examiner.*